Dec. 4, 1934. H. G. BANTLEON ET AL 1,982,723
DECORATIVE DEVICE FOR CAKES OR THE LIKE
Filed Dec. 9, 1933 2 Sheets-Sheet 1
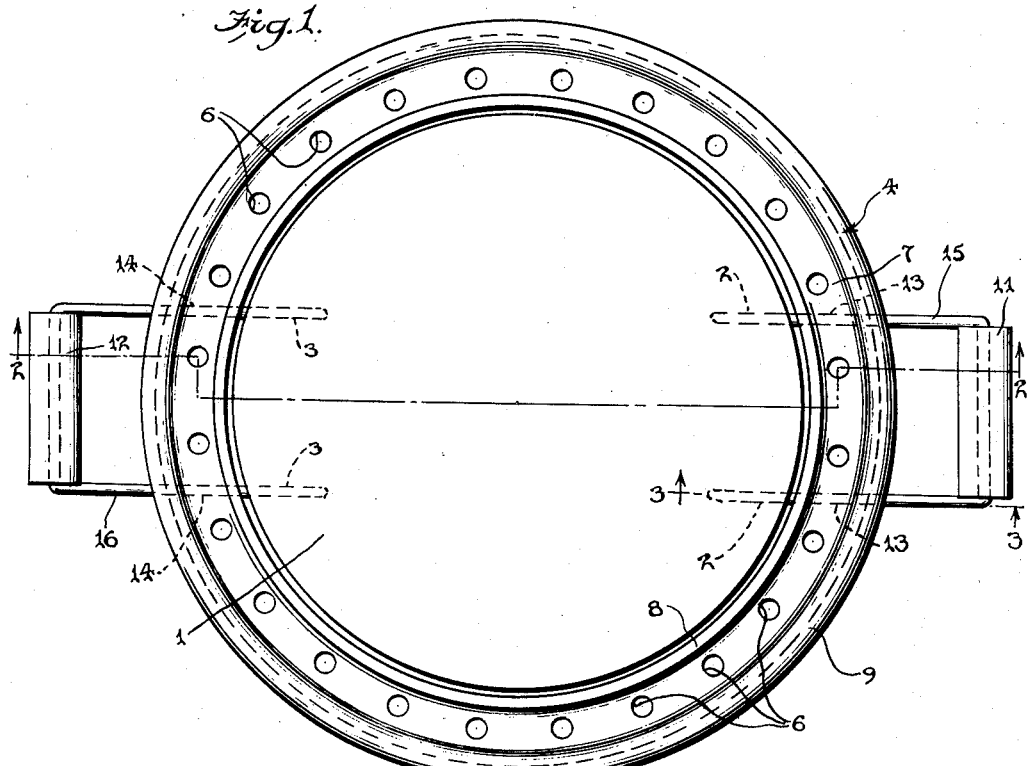
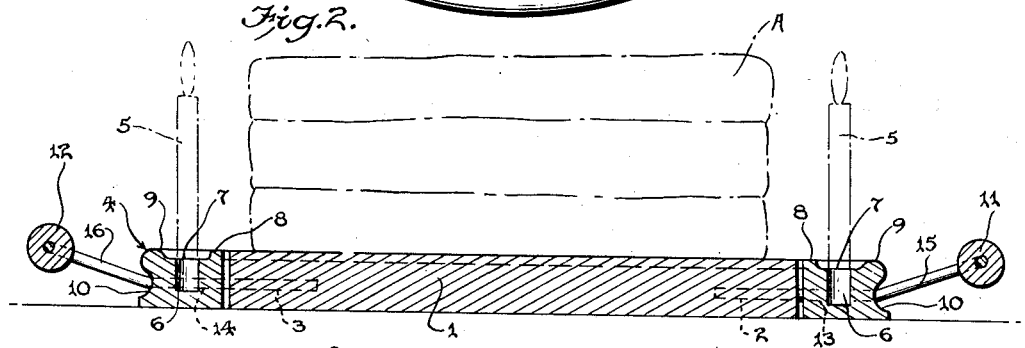
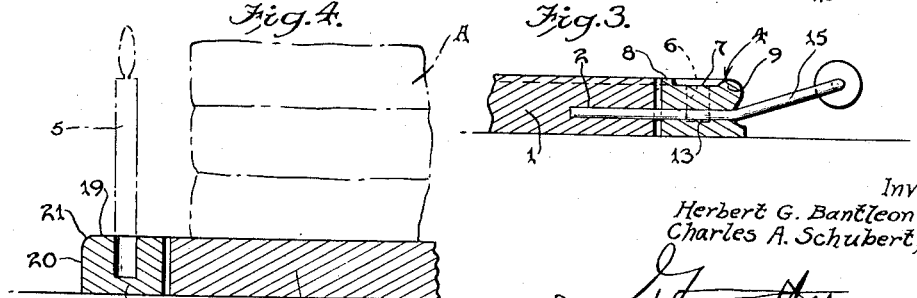
Inventors
Herbert G. Bantleon
Charles A. Schubert,
By
Attorney Dec. 4, 1934.   H. G. BANTLEON ET AL   1,982,723
DECORATIVE DEVICE FOR CAKES OR THE LIKE
Filed Dec. 9, 1933   2 Sheets-Sheet 2
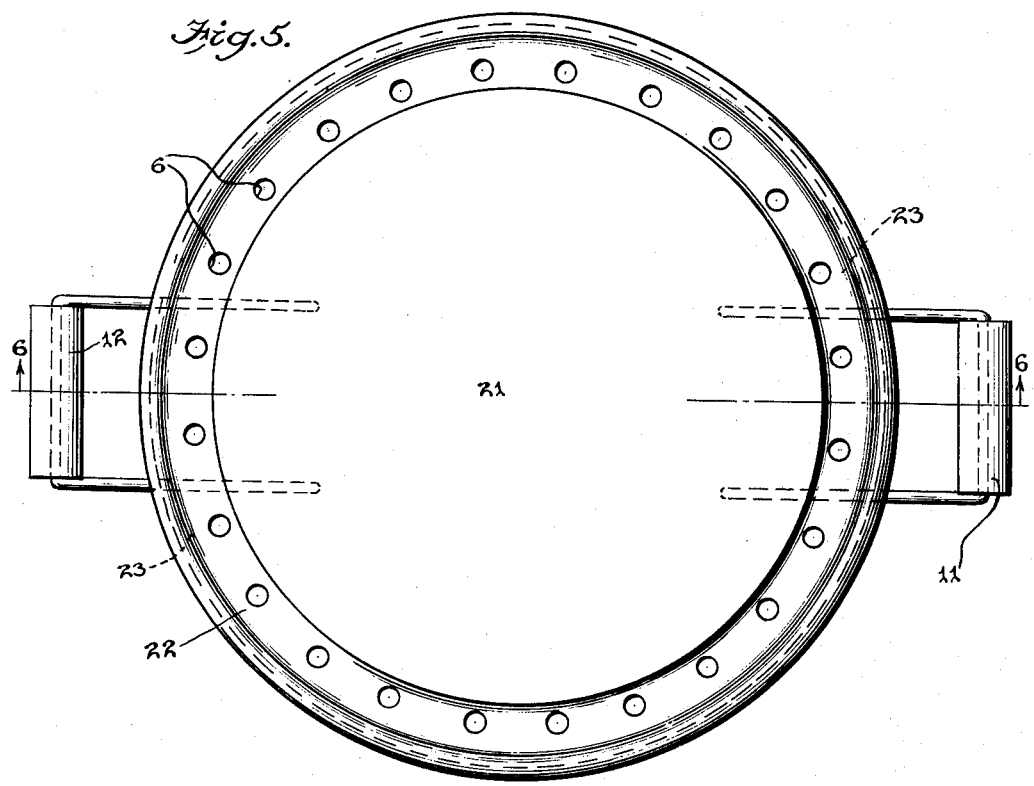
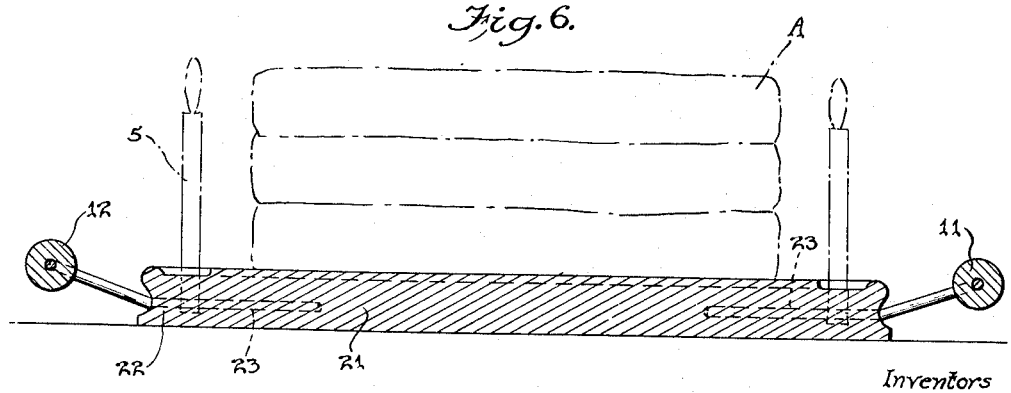
Inventors
Herbert G. Bantleon
Charles A. Schubert,
By
Attorney Patented Dec. 4, 1934

1,982,723

UNITED STATES PATENT OFFICE 1,982,723

DECORATIVE DEVICE FOR CAKES OR THE LIKE

Herbert G. Bantleon and Charles A. Schubert, Rochester, N. Y.

Application December 9, 1933, Serial No. 701,674

2 Claims. (Cl. 240—10)

This invention relates to a decorative device for cakes or the like.

One object of the invention is to provide a decorative or ornamental device for cakes or other commodities and which is adapted for use at festivities of all kinds, especially birthday celebrations.

Another object of the invention is to provide a cake or the like supporting means on which the cake or the like may be readily supported and surrounded by a detachable candle supporting member both of which may be readily detachably connected together by means providing handles whereby the complete device may be readily carried from one place to another without disturbing the cake or the like and without interfering in any way with the candles, and in which the candle supporting part of the device may be readily detached from the cake or the like supporting part and the cake supporting part with the cake or the like thereon readily moved separately from one place to another.

A still further object of the invention resides in the provision of an inexpensive, light, durable, attractive and effective device including a ring-like member of the nature stated provided with depressions forming candle supporting sockets and with detachable handles which are so associated with the ring-like member that the latter may be readily placed over or removed from surrounding relation with a cake or the like and which may be detachably connected or engaged with a cake support on which a cake or the like is supported and both this support and the ring-like member moved together from one place to another without danger of separation of the parts and without interfering with the candles, whether or not the same are lighted.

It is still further designed to provide an attractive device of the nature stated, embodying among other characteristics, means for the support of a cake or the like and for the support of a series of candles in surrounding relation with the cake or the like and which may be readily and conveniently moved from one place to another without removing the cake or the like and without interfering with the candles.

With the above and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Fig. 1 is a top plan view of one embodiment of the invention.

Fig. 2 is a transverse sectional view on the line 2—2 of Fig. 1.

Fig. 3 is a fragmentary sectional view on the line 3—3 of Fig. 1.

Fig. 4 is a fragmentary detail sectional view illustrating a modified form of the invention.

Fig. 5 is a plan view of a modified form of the invention.

Fig. 6 is a sectional view on the line 6—6 of Fig. 5.

Referring now to the accompanying drawings, and more particularly to Figs. 1 to 3 inclusive, the reference character 1 indicates a cake or the like support, composed preferably of a circular piece of wood, but which may be made of any other suitable material. This support 1 may be of any size and thickness desired, and formed at opposite points in the peripheral edge of the support 1 are pairs of sockets 2 and 3 for a purpose presently explained.

A relatively narrow annular or ring member 4 of wood or other suitable material is adapted to embrace or surround the cake or other support 1 for the support of candles 5 which are preferably mounted in suitable sockets 6 formed preferably at equidistant points in the top face of the ring between the edges thereof.

The ring may have a continuous annular groove 7 in its top face in which said sockets 6 are arranged and in which groove drippings from the candles will be confined because of the inner rib 8 and the outer ornamental bead 9 and thereby protect the support 1 or the cake A from melted candle grease.

The ring 4 may also have the peripheral groove 10 for ornamental purposes and to permit one's thumbs to engage therein with their fingers under the support 1 and the ring 4 to move the device with the cake thereon from one place to another in the event the handles 11 and 12, hereinafter referred to, are not employed for such purpose.

The ring member 4 is provided with pairs of oppositely disposed sockets 13 and 14 adapted to aline with the respective pairs of sockets 2 and 3 of the support 1 to receive the legs 15 and 16 of suitable handles 11 and 12, respectively, and thereby fasten the support 1 and the ring 4 together, so that by grasping the handles 11 and 12 the cake or the like on the support 1 may be readily carried from one place to another without danger of separation of the support 1 from the ring 4 and without interfering with the candles 5 supported in the sockets 6. These handles 11 and 12 may be of any shape or design and are preferably of metal, and may be of nickel, brass or other material or enameled for ornamental purposes.

The handles 11 and 12 may be withdrawn from the sockets 2 and 3 of the support 1 so as to enable a person to grasp the handles and lift the ring 4 with the candles 5 in the sockets 6 from over the cake or the like on the support 1. If desired, the handles 11 and 12 may then be removed entirely from the ring 4 and inserted in the respective sockets 2 and 3 of the support 1 so as to facilitate movement of the cake or the like on the support 1 from one place to another.

It will thus be seen that the handles 11 and 12 cooperate with the cake or other support 1 and the ring 4 in such a manner that the support 1 and ring 4 may be readily locked together for movement together and readily separated when desired, and either the board 1 or the ring 4 readily transported independently from one place to another.

It will also be understood that the ring 4, with the candle supporting sockets 6, and with or without the use of candles or the handles 11 and 12, may be employed separately from the support 1 and placed to surround a cake or the like resting on a supporting means other than the supporting means 1.

If desired, and as shown in Fig. 4, the annular continuous groove 7 and the peripheral groove 10 may be eliminated as illustrated in Fig. 4 wherein it will be seen that the ring 18 may have a flat upper face 19 and a grooveless periphery 20 with the upper outer edge rounded, as indicated at 21.

As illustrated in Figs. 5 and 6, the cake or like support 21 may be formed in one piece of wood or other material, with the ring or candle supporting part 22 and the device formed otherwise as heretofore described including pairs of sockets 23 as in the other forms for the reception of the legs of the handles 11 and 12, as will be understood.

The decorative device herein described in various forms is one which may be made in various sizes and thickness and can be cheaply produced, especially if made of wood, and easily and quickly cleaned, and used to advantage not only at birthday parties or celebrations but at other festivities as well, and it will be understood that either the cake or like support or the surrounding candle ring can be used separately or together and that the handles, if used, are interchangeable with relation to either the support or ring or to fasten both together for movement together.

What we claim is:

1. A decorative device of the character described comprising a ring shaped member provided with a continuous peripheral groove and also having a continuous annular groove in its upper face near the outer edge thereof and having a plurality of sockets formed in the annular groove and having oppositely disposed pairs of sockets formed transversely therethrough from the outer to the inner side of the ring member, and handles mounted in said pairs of sockets of the ring member whereby to move the ring from over a cake or other commodity from one place to another.

2. A decorative device of the character described comprising a ring shaped member adapted to surround a cake supporting member and having an annular series of sockets formed in the upper face thereof to receive candles, and having pairs of oppositely disposed sockets extending transversely through the ring member, and handles each having legs slidably fitted in said ring member sockets for extension inwardly beyond the inner wall of the ring member for engagement with a cake supporting member upon inward sliding movement of the legs of the handles to permit movement of the cake supporting means and the ring member together and whereby upon outward sliding movement of said legs from engagement with the cake supporting member the ring member may be removed by the handles from around the cake supporting member.

HERBERT G. BANTLEON.
CHARLES A. SCHUBERT.